United States Patent [19]
Carter

[11] Patent Number: 5,373,282
[45] Date of Patent: Dec. 13, 1994

[54] DEALER INFORMATION AND SECURITY APPARATUS AND METHOD

[76] Inventor: Ronald L. Carter, 104 Commerce Dr., Greer, S.C. 29651

[21] Appl. No.: 830,678

[22] Filed: Feb. 4, 1992

[51] Int. Cl.⁵ .............................................. G08B 13/00
[52] U.S. Cl. .................................... 340/539; 340/426;
340/542; 340/825.31; 340/932.2; 70/63;
235/382
[58] Field of Search ............... 340/426, 542, 543, 539,
340/932.2, 825.31, 429; 70/63, 277; 235/382,
385

[56] References Cited

U.S. PATENT DOCUMENTS

| | | | |
|---|---|---|---|
| 3,093,994 | 6/1963 | Richard | 70/434 |
| 3,710,371 | 1/1973 | Whalen et al. | 340/571 |
| 3,733,862 | 6/1973 | Killmeyer | 70/DIG. 51 X |
| 3,742,741 | 7/1973 | Cahan | 70/63 |
| 3,889,501 | 6/1975 | Fort | 70/DIG. 51 X |
| 3,902,342 | 9/1975 | Zucker et al. | 70/DIG. 51 X |
| 3,925,763 | 12/1975 | Wadhwani et al. | 340/573 |
| 4,090,175 | 5/1978 | Hart | 70/DIG. 51 X |
| 4,187,497 | 2/1980 | Howell et al. | 340/429 |
| 4,369,481 | 1/1983 | Early | 70/DIG. 51 X |
| 4,609,780 | 9/1986 | Clark | 379/103 |
| 4,656,851 | 4/1987 | Leek et al. | 70/DIG. 49 X |
| 4,985,694 | 1/1991 | Sunami | 340/542 |
| 4,990,890 | 2/1991 | Newby | 340/904 |
| 4,996,514 | 2/1991 | Sunami | 70/DIG. 51 X |
| 5,046,084 | 9/1991 | Barrett et al. | 340/825.31 |

FOREIGN PATENT DOCUMENTS

| | | | |
|---|---|---|---|
| 0293137 | 11/1988 | European Pat. Off. | 70/278 |
| 2516283 | 10/1976 | Germany | 70/278 |
| 597478 | 4/1978 | Switzerland | 70/434 |

*Primary Examiner*—John K. Peng
*Assistant Examiner*—Edward Lefkowitz
*Attorney, Agent, or Firm*—Ralph Bailey

[57] ABSTRACT

A security key control information system and method for vehicle dealerships and the like is provided. A key storage device A mounted to each vehicle window has a compartment for storing access keys B to the respective vehicles and contains a sensing device H which produces a signal indicating whether an event related to that vehicle is routine or hostile. A second device may be permanently attached to the vehicle for regularly transmitting identifying information as to that vehicle. Both devices report the information by radio through an intermediate transmitter network to a computer D inside the dealership which records the information along with the time of the event. The information is stored for subsequent retrieval for the purpose of generating reports useful to the dealership management. If an event is hostile, appropriate action may be taken including suitable signaling.

10 Claims, 13 Drawing Sheets

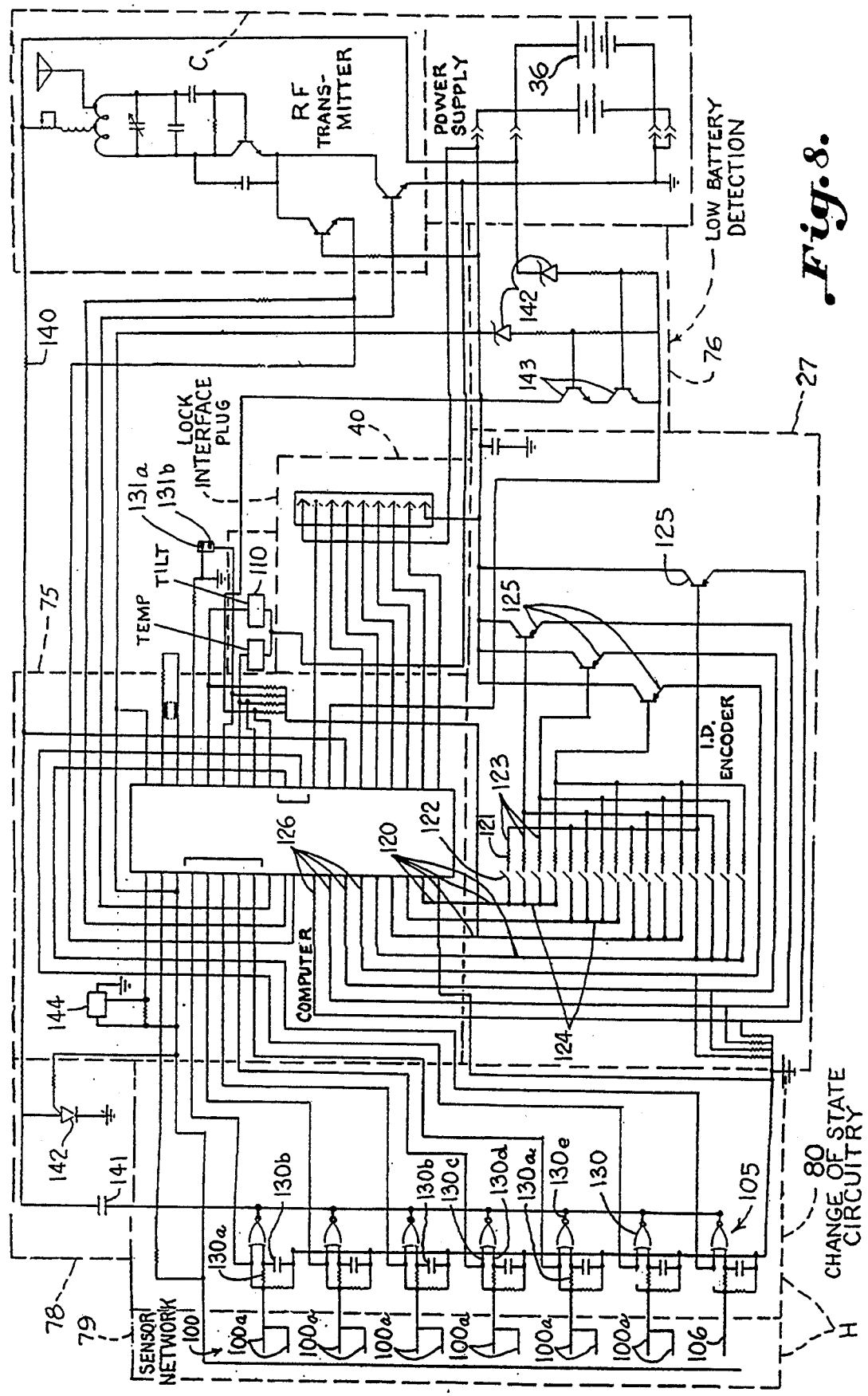

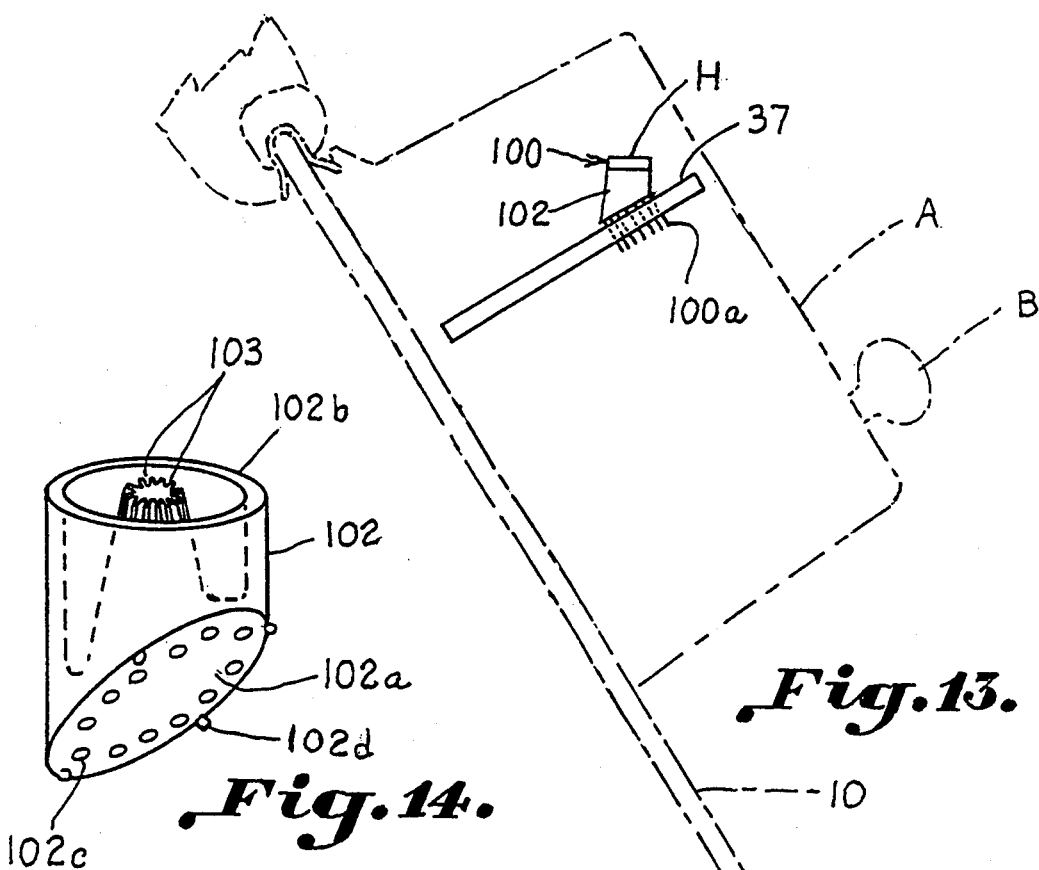
Fig. 13.
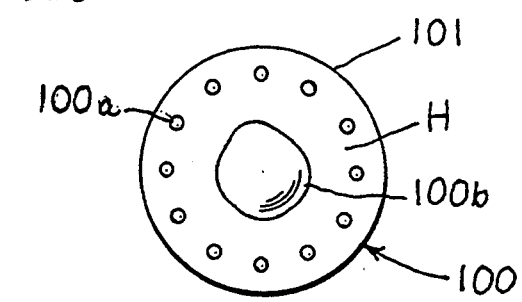
Fig. 14.
Fig. 15.
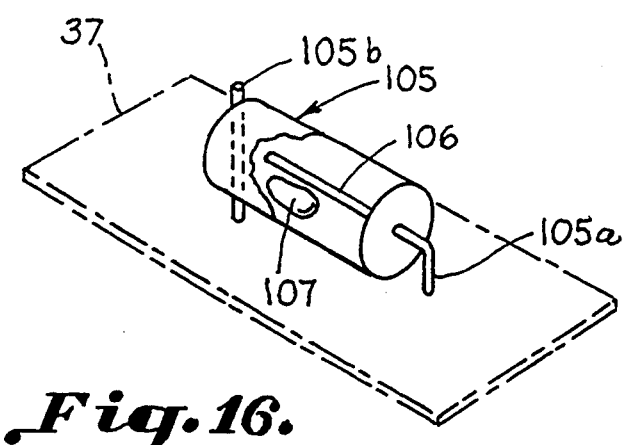
Fig. 16.
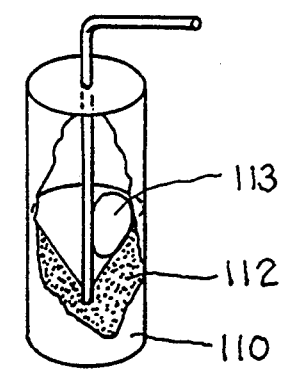
Fig. 17.

DEALER INFORMATION AND SECURITY APPARATUS AND METHOD

BACKGROUND OF THE INVENTION

This invention relates to apparatus and method for affording security as well as operational data for managing automobile dealerships and the like.

New car dealerships and other transportation related organizations, for example, must maintain a constant effort to prevent the theft of vehicles and parts. Customer vehicles left for service are a major concern of management because these vehicles are often parked in the rear of the dealership where the repair facilities are most often located, making such vehicles targets for damage and theft. A customer who has experienced vehicle loss through theft and vandalism at a dealership will often look elsewhere for a secure place to do business.

While it is desirable to find some method for deterring the theft and vandalism of vehicles and parts, it is equally important to have a security system which will not deter but rather welcome potential customers who would look at automobiles at times, such as on Sunday afternoon, when the dealership is closed.

Moreover, vehicle manufacturers and dealership management must confirm that vehicles listed in inventory are in fact located on the dealership premises. The institutions who have financed or floor planned this inventory need to confirm that the vehicles financed are still on the lot being offered for sale. Likewise, the dealers who want to ensure a good, long-term relationship with the lending institution are equally interested in verifying their floor plans through inventory audits. In both cases, it is advantageous as well as a savings in both time and labor to be able to audit the inventory automatically without the need for physically checking every vehicle.

Additionally, dealerships have a problem keeping up with the keys to the vehicles and supplying them for the respective vehicles when needed. There are several apparent advantages to having the keys at the vehicle in terms of convenience for both the dealership staff and the customer. It has been found that a dealership will make more sales if the keys can be kept at the vehicle. Unfortunately, having the keys at the vehicle results in a loss of security. Insurers of vehicle dealerships may cancel policies or charge a higher premium and deductible for dealerships keeping the keys at the vehicle.

It is an important object of this invention to facilitate management of keys for many different vehicles, providing accountability as to who has had the keys, record what happened while a particular individual was in possession of those keys, and determine how long this activity lasted.

Another object of the invention is to automatically assist management as, for example, determine when a customer has come onto the lot, how long it took for a salesperson to greet that customer, which salesperson greeted the customer, which vehicles that salesperson demonstrated to the customer, which vehicles were used to take a customer on an actual test drive, and how long the test drive lasted. More informed decisions may be made as determining business hours, proper staffing and quantity and styles of inventory.

It is important that these and related systems function automatically. Because matters relating to vehicles at dealerships are constantly in a state of flux, it is necessary for any monitoring apparatus to be easily attached and detached from any vehicle.

Another important object of the invention is the provision of a security device having change of state sensors for indicating hostile activity.

The prior art includes U.S. Pat. No. 4,187,497 which discloses an alarm system for vehicles utilizing a motion sensitive closure means for actuating a radio transmitter conveying information to police or security guards. U.S. Pat. No. 4,155,067 illustrates a motion sensitive device providing an alarm responsive to movement of parked vehicles. A lock actuated by keys which are provided with means indicating authorization or lack thereof are illustrated in U.S. Pat. Nos. 3,733,862 and 4,996,514. The following United States patents further illustrate the state of the art: 4,636,950; 4,737,758; 4,766,746 and 4,812,985. Japanese Patent Application Nos. 53-34165 and 53-34166 illustrate additional features of the prior art.

SUMMARY OF THE INVENTION

It has been found that these and other objects may be accomplished by the provision of an automobile key storage box with a lock which can identify which individual key out of a multitude of acceptable keys is presently being used to gain entry, having sensing devices and related storage, signaling and warning apparatus, together with transmitting means for supplying resulting signals to a central computer. Access to the key storage boxes can only be gained by individuals with prior knowledge of the apparatus and method for gaining entry into the secured areas. The boxes themselves may each be provided with permanent indicia so as to be readily identified by anyone seeking a particular unit.

When a vehicle is prepared for placement on the dealership lot, a particular storage box may be mounted, as for example, on the window glass and the identity of both the vehicle and the storage box recorded in a central computer.

Thus, apparatus constructed in accordance with the invention can be specific in its reports and its responses. It should be noted, however, that the system will still function properly whether this identification step is taken or not. The apparatus is also capable of discerning the character of an event taking place with a particular vehicle. This, combined with the locking device which is capable of identifying who has gained entry to a particular vehicle, provides a versatile system for gathering data and reporting and summarizing the operations and activities surrounding a vehicle dealership.

Sensing devices determine whether the activity concerning a vehicle is routine or hostile. Action concerning vehicles, as well as entry into the lock boxes on the vehicles, is reported to a computer inside the dealership by radio signals all of the same frequency which may be relayed by intermediate receiving and transmitting booster devices suitably mounted as on the dealership light poles. The central computer stores this information along with the time of the occurrence so that this information may be sorted and printed out in report form, either automatically or on demand. The central computer may also respond in a number of appropriate predetermined ways to incoming information.

In the case of routine occurrences, the computer may store the information or automatically print a report at a given time as specified by the dealership management. If the dealership is closed and the apparatus reports customers are shopping on the lot, the central computer may activate a playback module having any message the dealership management deems appropriate.

In the case of a hostile occurrence, the apparatus may immediately activate sirens and flashing lights as well as activating a voice talker such as a prerecorded audio playback unit, digital playback unit, tape recorder and the like, and cameras. All of these devices may be mounted with the intermediate receiving and transmitting devices on the dealership light poles.

If the devices mounted on the vehicles report a malfunctioned circuit or low power or if the central computer does not receive a periodic check-in message, means are provided to give an appropriate signal.

In order to verify a floor plan through an inventory audit, a transmitter with the vehicle's identification information may be permanently secured at a suitable location on the vehicle, either during the actual assembly of said vehicle at the factory or later. In any event, the transmitter having a suitable power supply may periodically transmit the vehicle's identification information to the central computer. On command or automatically at a preset time, the apparatus may verify that a particular vehicle is still on the dealership premises and display or print a complete list of all vehicles currently floor planned and on the dealership premises. The apparatus may also display and printout which floor planned vehicles are not on the dealership premises and may also report the last time the vehicles were on the dealership premises, and identify the last person to gain access thereto.

The apparatus may be used as security devices at entry points to the various dealership facilities, employing various movement sensing devices. The apparatus may also record the traffic flow at such locations. The central computer then directs appropriate actions by the apparatus. Authorized personnel may gain entry during closed hours by entering their identification code at suitable code entry points.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1-A is a schematic diagram illustrating an alternate form of the invention;

FIG. 5-A is a transverse sectional elevation similar to FIG. 5 illustrating the locking mechanism for use in the key box in unlocked position;

FIG. 6-A is a side elevation illustrating means for energizing the sensing mechanism when the key storage box is about to be opened;

FIG. 8-A is a side elevation illustrating a single in line package for use in decoding signals in the storage box;

FIG. 13 is a side elevation illustrating a mounting spacer for positioning, in the key storage box, a sensing mechanism which is dependent for operation upon its physical orientation constructed in accordance with the invention;

FIG. 14 is a perspective view further illustrating the positioning spacer;

FIG. 15 is a top plan view of the positioning spacer;

FIG. 16 is a perspective view illustrating a vibration sensor for use in accordance with the invention; and FIG. 17 is a perspective view of a tilt sensor for use in sensing apparatus in accordance with the invention.

DESCRIPTION OF A PREFERRED EMBODIMENT

Figure 1:
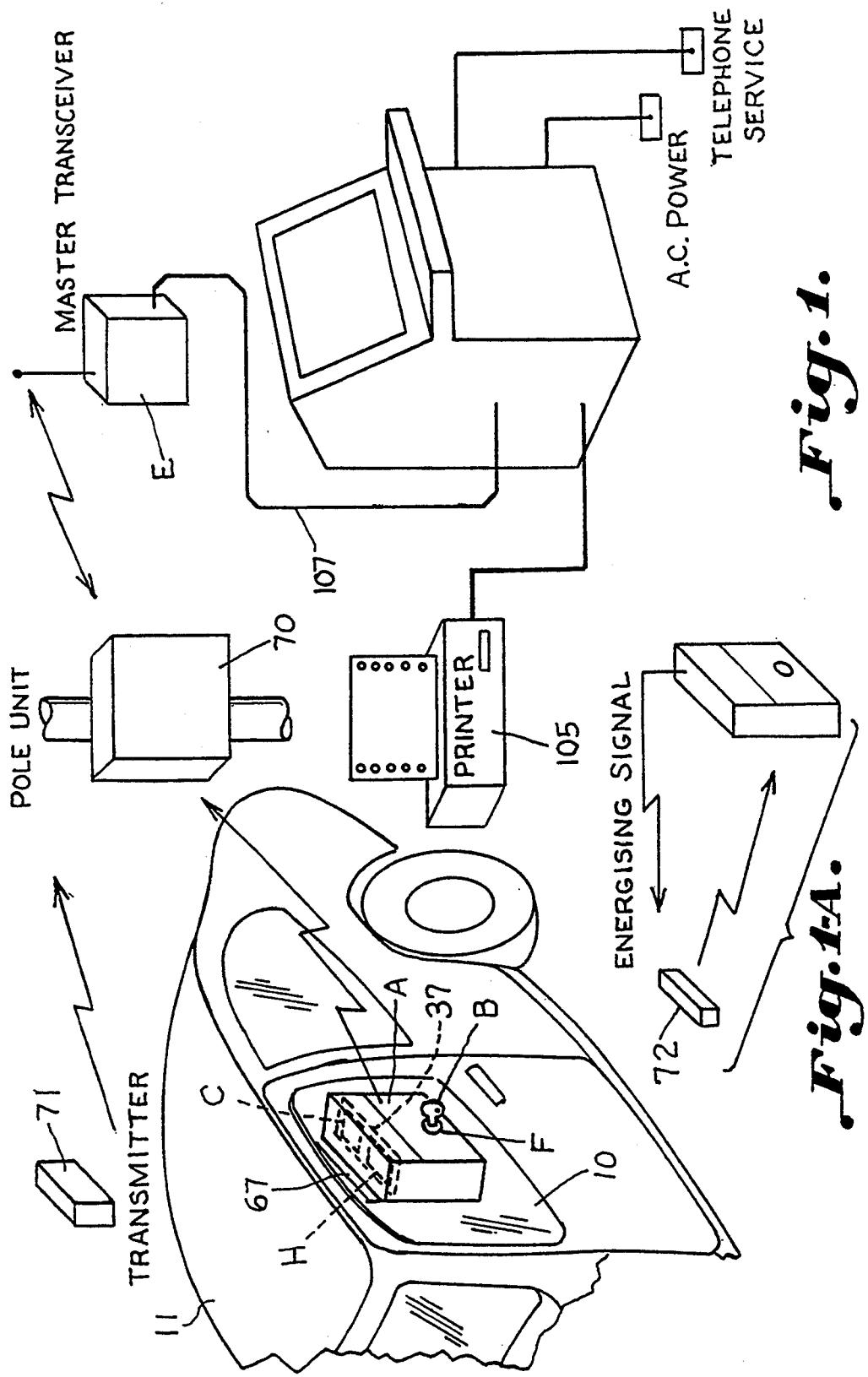
FIG. 1 is a schematic perspective view illustrating a dealer information and security device and method constructed in accordance with the invention.

The drawings illustrate a key operated control system for vehicles including a plurality of storage devices A each containing a key for a respective vehicle. An encoded access Key B is provided for limiting and gaining access to the storage devices and the vehicle keys stored therein. A radio frequency transmitter C is carried by each vehicle actuated responsive to the access key transmitting a signal that a respective vehicle has been accessed. A central computer D receives the signal and monitors the vehicles on a premises or lot of the vehicle dealership. A receiver E inputs the signal into the central computer D. A lock F is carried by the storage devices limiting access thereto and identifies which person such as a salesman selected from a larger group of such as the sales force has gained access. Means including a plurality of notches G are provided for encoding each of a plurality of access keys indicating which predetermined person or persons selected from a larger group of persons is possessed of each key when subjected to light or other signaling or actuating means. For example, a source of light may energize a sensing means by receiving light from a notch in the key producing a signal indicative of the identity of the person or persons having the access key.

A sensor array H is carried adjacent a respective vehicle of the group of vehicles periodically sampling conditions adjacent the vehicle. A change of state pulse generator, as described below, actuates the computer 75 on any change of state in the sensor network responsive to conditions adjacent the vehicle.

KEY STORAGE AND SENSING DEVICE MOUNTED ON VEHICLE WINDOW

As illustrated in FIGS. 1–7, the storage device or box A includes a container that may preferably be molded of polycarbonate so that a housing provided thereby is both tough and durable and will not interfere with a radio signal. The container or housing forming the storage box A is attached to the vehicle window glass 10 by means of a clip designed to be hidden from view when positioned on the vehicle glass and the glass is fully rolled up. The clip is also designed to fit any window glass on any vehicle regardless of how small or large without breaking or deforming itself or the window glass and without causing wind noise as may result from altering the configuration of the rubber around window tract. The clips are designed so as not to stick either in the window track or to the window glass. The clip is made of spring steel and resiliently grips the glass.

The housing of the storage box A is comprised of two main parts. One part is used to store the keys to the vehicle. This part is secured by means of a lock which may be unlocked by any one of many keys which are keyed alike except for the encoding. The lock and key serve a two-fold purpose. The first is to provide a means of securing the vehicle's operating key safely in the compartment and providing ready access to the vehicle's key to anyone who has an access key B. The second purpose of the special lock and key is to identify the individual who is gaining access to the vehicle's key at what time and for what purpose. Keys are encoded to give special meaning, through operation as by the central computer, and therefore have restricted use as in the case, for example, of a manager being allowed access to certain areas after hours. This is accomplished by the lock's ability to distinguish any particular key that is used of a multitude of keys that would function to operate the lock. The particular key, having been assigned to a particular person, readily identifies that person upon that person's use of the key. This information is relayed to the second part of the housing by a cable connection.

The second part of the housing is an access restricted compartment provided for the purpose of securing electronic circuitry of computer based sensing devices, a receiver of the key identification information, a radio transmitter C, and a power source suitable for driving all of the electronic circuitry and components.

The sensing devices H and computer 75 determine whether an event occurring adjacent the vehicle is a routine occurrence, such as people shopping for a vehicle, or if the action is a hostile occurrence such as a thief or vandal stealing or damaging the vehicle or vehicle parts. The sensors automatically take into account the inclination of the vehicle in a given position and disregard any different inclination the vehicle may have been parked on earlier. This means the dealership need not concern itself with having to align either the vehicle or the device in any particular fashion.

Signals from the sensing device, like signals from the lock, contain information supplied to the computer in the storage box A. Processed information is prepared by this computer for transmission via the radio transmitter C to the central computer D located inside the dealership. To ensure the dependability of the device, its circuitry and its power supply levels are checked periodically. If either the circuitry or power supply level is below performance specification, then the device reports its status and the condition to the central computer D. Even if the device checks and confirms it is operating well within performance specifications, a check in message is still required. This allows the central computer D to perform a cross-check as it looks for any devices that have not checked in. To ensure receipt of the signal by the central computer, an intermediate network has been devised as will be described in greater detail below.

The drawings (FIGS. 1–7) illustrate a lock F having a cylinder housing, and a cylindrical plug for receiving a key B in an elongated axial slot carried in the cylinder housing. The lock is shown positioned for securing a drawer of storage box A in closed position. FIG. 6 illustrates a plurality of spaced openings in the plug which permit the passage of light therethrough. Aperture means in a cylinder housing supply light to the spaced openings in the plug. A plurality of encoded keys B each have at least one notch arranged therein to permit the passage of light through a predetermined opening in the plug. The key excludes the passage of light through another predetermined opening in the plug. The notches are arranged to encode information. A light sensor receives the information encoded in the predetermined arrangement of notches when a key is inserted into the slot in the plug. If desired, any form of switching such as mechanical switches may be actuated responsive to the encoding of the keys in lieu of the light actuated means described above.

Figure 2:
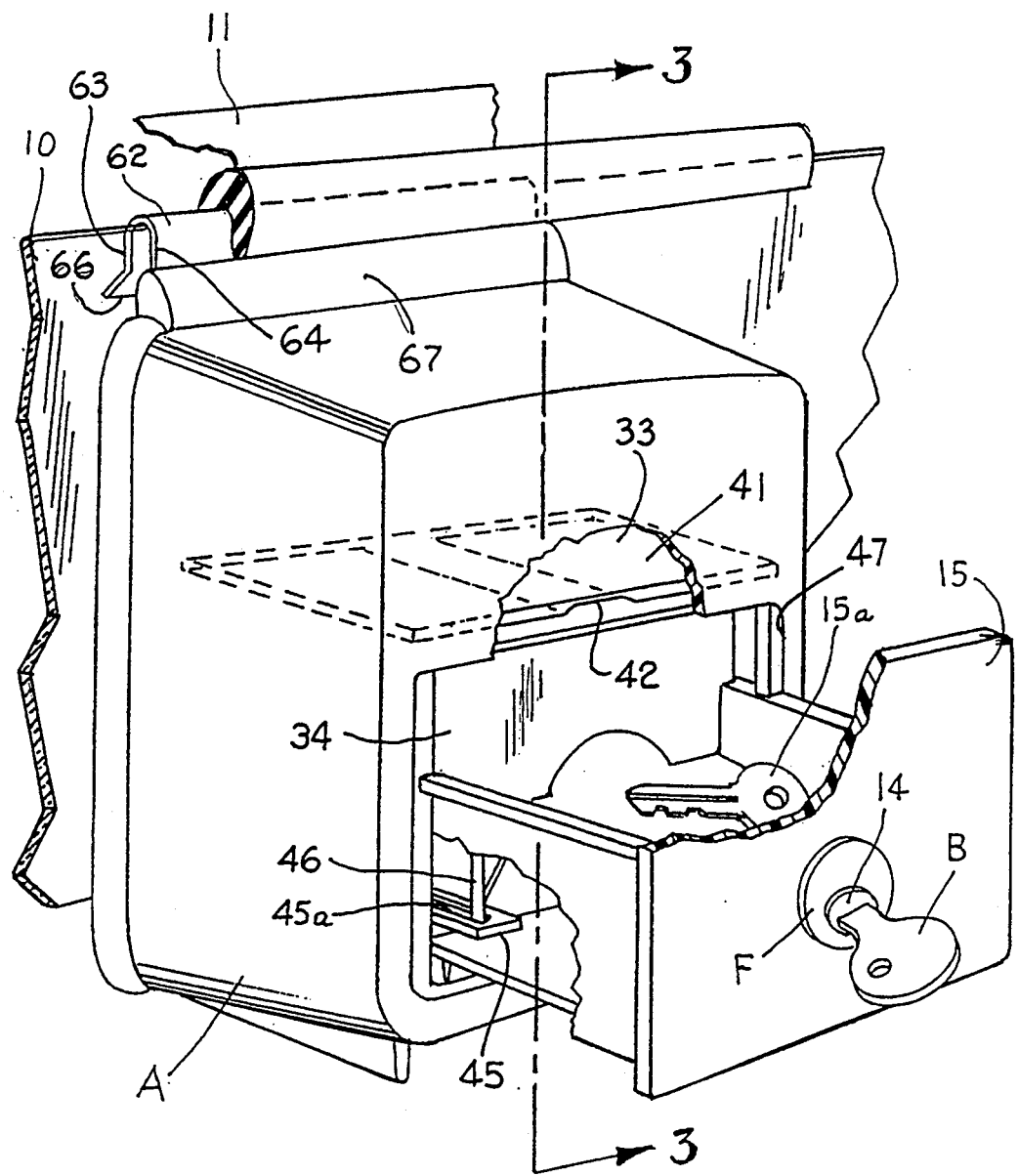
FIG. 2 is a front perspective view illustrating a key storage box, containing a vehicle operating key and various sensing and transmitting means, mounted on the window of an automobile.
Figure 3:
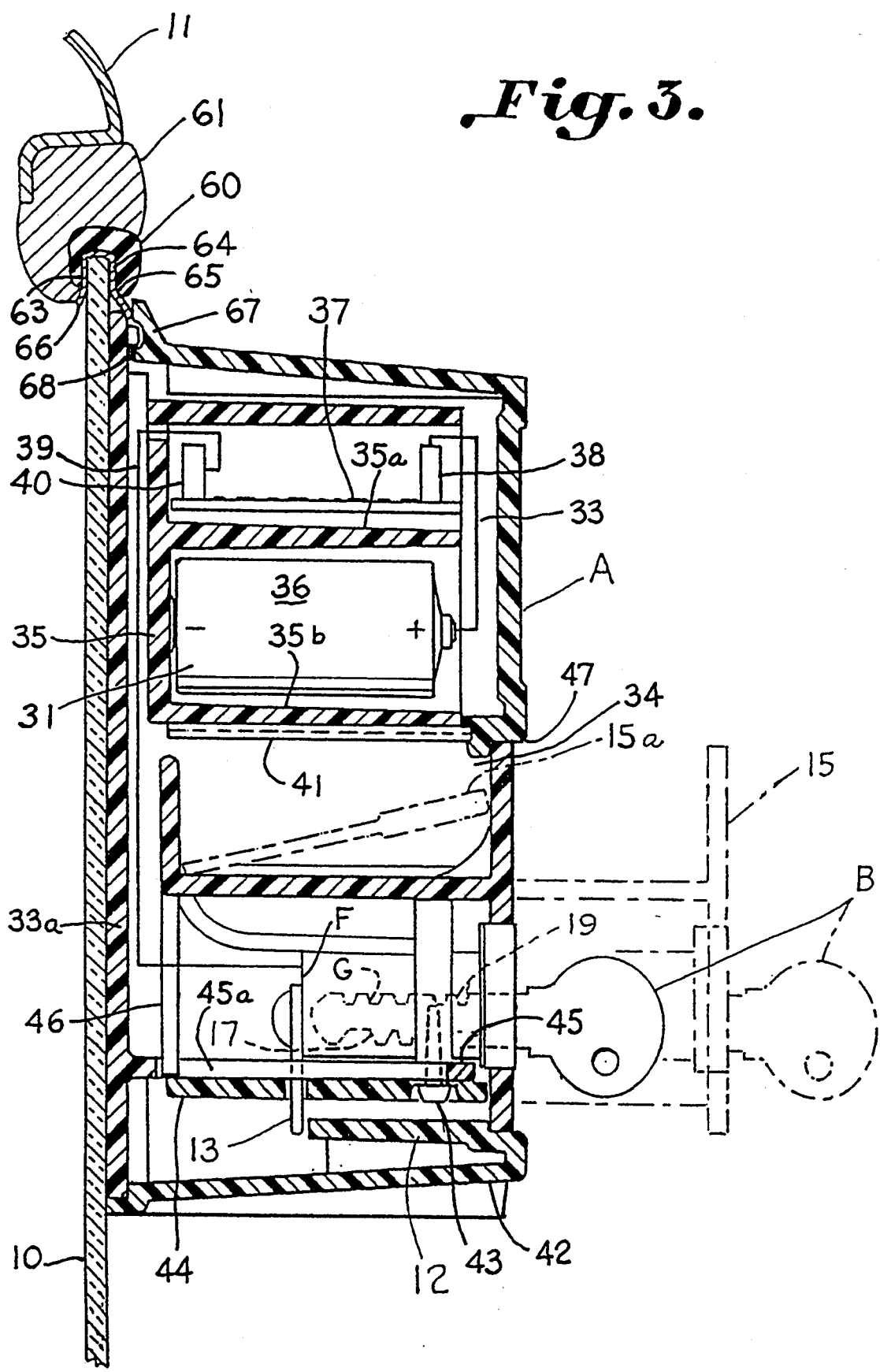
FIG. 3 is a longitudinal sectional elevation taken on the line 3—3 in FIG. 2.

FIGS. 1, 2, and 3 illustrate a storage box A positioned upon the glass 10 of the window of an automobile 11. The box A is illustrated in FIG. 3 as including an abutment 12 which projects inwardly to provide a stop for locking a cam 13 carried by the cylindrical plug 14 of the lock. The lock is carried in a slidable drawer 15 or other closure within the box A for storing a desired article such as an operating key 15a for the respective automobile upon which the box is carried. If desired, another suitable access means such as a hinged door and the like may be utilized in lieu of the sliding drawer for providing access to a suitable compartment or other storage device.

Figure 4:
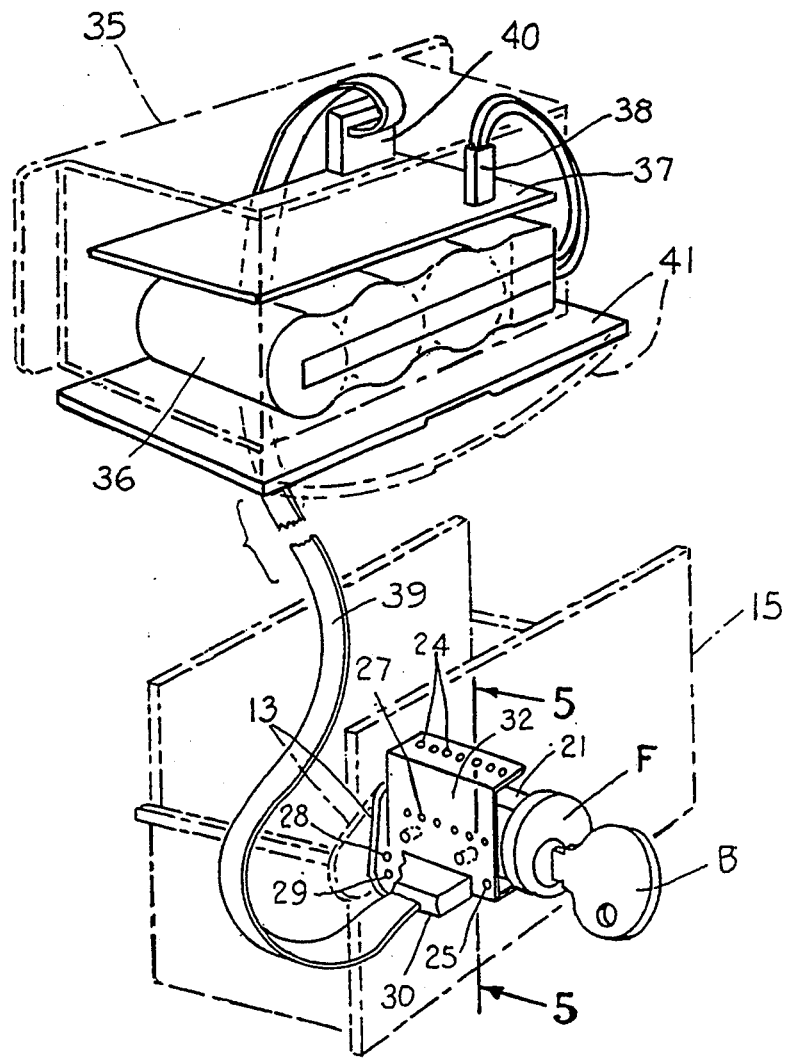
FIG. 4 is a front perspective view illustrating a lock with access key identifying device in combination with various electrical components of the key storage box constructed in accordance with the invention.

The key B has a shank with guiding grooves 16 and conventional notches or serrations are provided as at 17 along one edge. The key is intended to cooperate with a tumbler type lock so that the notches and intervening projections operate suitable tumblers (not shown) of the lock. The spine 18 of the shank of the key is notched as at 19 in a pattern to cooperate with multiple bores or apertures 20 in the lock body or housing 21 (FIGS. 4–6).

The lock consists of a body or housing 21 and a plug 14. When an inserted access key B correctly matches suitable tumblers, the plug may be rotated on its axis. A cam 13 or other locking arm or device, is attached to the plug, causing locking and unlocking or some other desired function when the plug is rotated. The body retains the plug and serves as a housing for the tumblers and their associated parts.

Figure 5A:
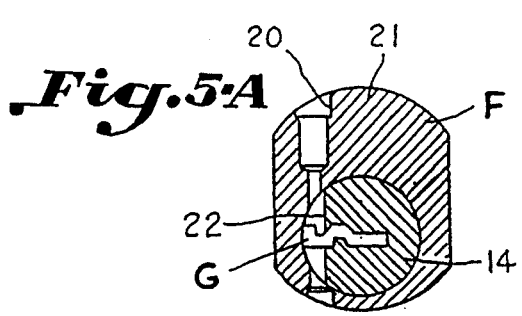
FIG. 5 is a transverse sectional elevation, taken on the line 5—5 in FIG. 4, further illustrating the lock in locked position.
Figure 5:
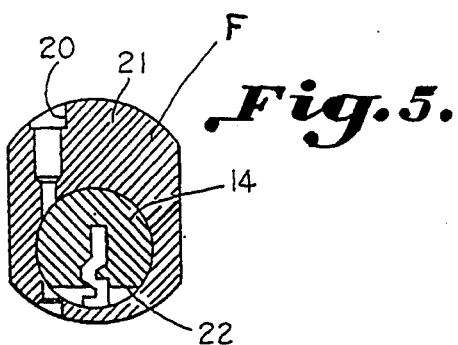
Figure 6:
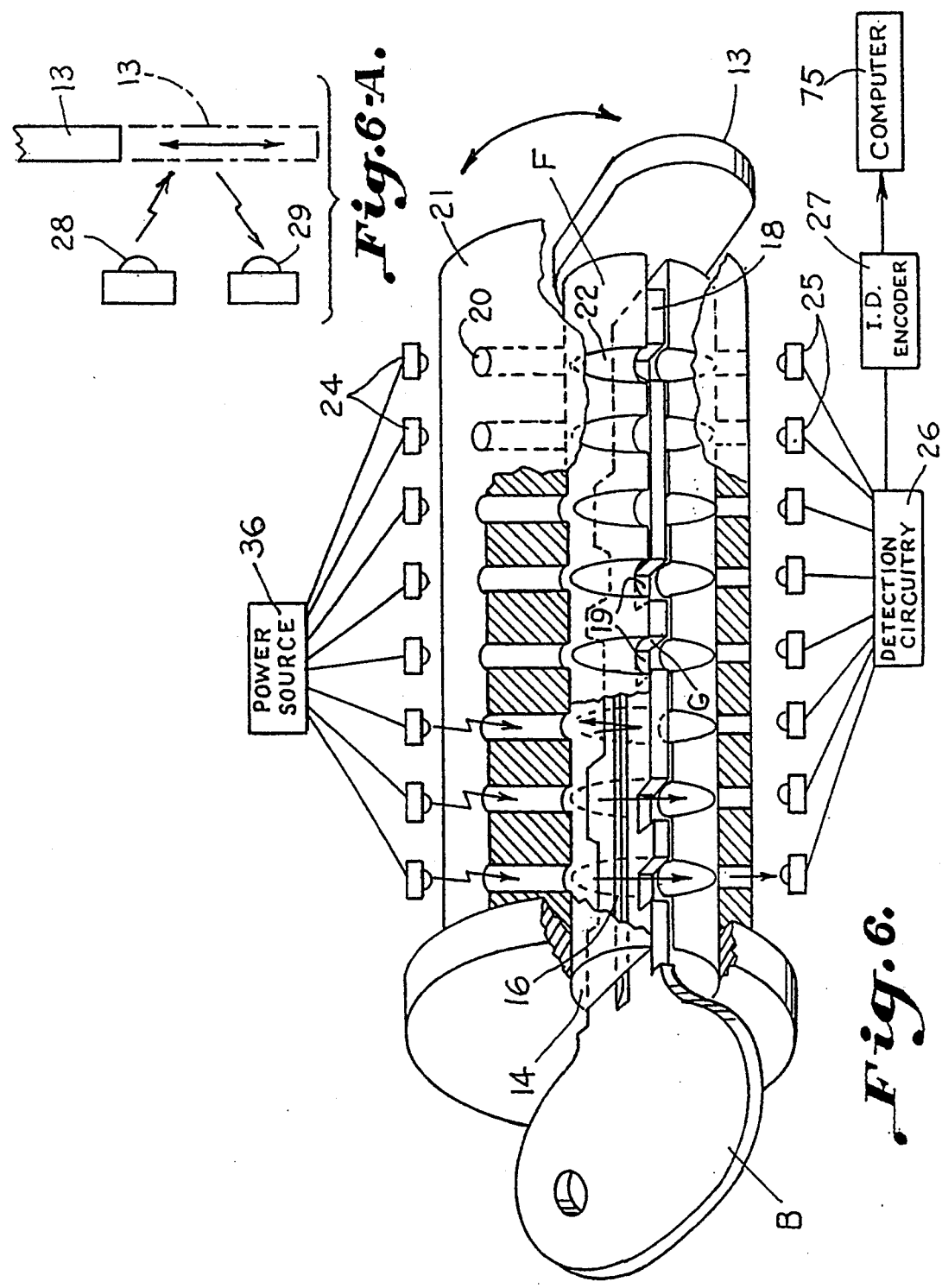
FIG. 6 is an enlarged perspective view, looking toward the front right hand side with parts omitted, illustrating an access key and sensing mechanism for use in the key storage box.
Figure 7:
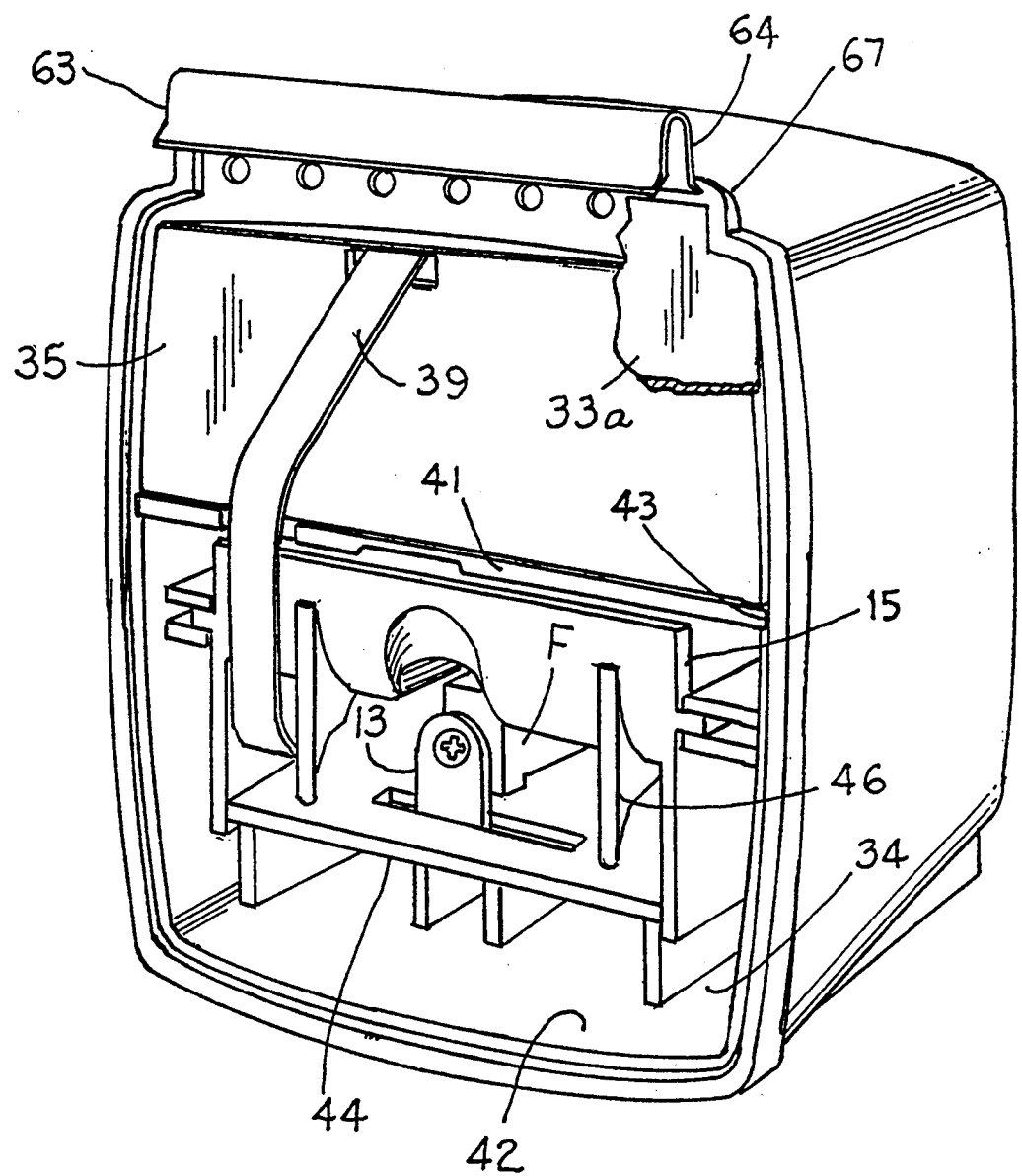
FIG. 7 is a rear perspective view of the key storage box with the back broken away.

FIGS. 5, 5-A and 6 illustrate a series of passages or apertures 20 formed in the body 21 of the lock and the series of openings 22 placed in the plug so that when the plug is rotated in the body to the actuating position, the passages in the plug and the passages in the body line up so that in the absence of any intervening or masking key material, light may pass through the apertures in the body of the lock, through the openings in the plug, and on out through to the other side of the lock.

The notches 19 form a pattern G in the spine of the key inserted in the lock and when turned to the actuating position as in FIG. 5-A, provide a pattern of open and blocked passages that are decoded into a key identification. A series of light emitters or sources 24, provided with power through the plug 30 from the power source 36, are placed so that their emitted light passes into the apertures and openings on one side of the lock. A series of light detectors 25 are placed on the other side of the lock such that, in the instance of an open passage, light from the emitter falls on a respective detector. The light emitters and light detectors are illustrated in FIG. 4 as positioned upon opposite legs of a mounting bracket 32. In the case of the absence of a notch in the key, causing the light to be blocked, the light from the emitter will not fall on the detector. This pattern of passed and blocked light is decoded by suitable circuitry including detection circuitry 26 and encoding circuitry 27 connected to the detectors through the plug 30 to yield an identification symbol. The limit of identification numbers or symbols is controlled as a binary function of the number of passages in the lock body. Four passages would yield sixteen possible symbols while eight passages, as illustrated, would yield two hundred fifty-six possible symbols. Some of the identification bits could be used for parity or error correction, and others, specifically the all light blocked and all light passed conditions could be interpreted as not allowed states. These two particular identifications could relate respectively to an unencoded key and a possible lock picking attempt. The decoding electronics may be used to sound an alarm or make notification or record of the event as by suitable computer discussed below.

An additional infrared light emitting diode (LED) phototransistor pair 28 and 29, shown in FIG. 6-A, respectively may be used to detect actuation of the lock. Light from the LED is reflected from the cam as the lock plug is rotated. If the light is reflected, it is picked up by the phototransistor 29 which actuates a suitable electrical signal indicating that the lock has been opened.

Thus, a keyed alike lock with multiple key identification capabilities has been provided.

The lock or storage box includes an upright housing A having an upper compartment 33 which contains electronic components and a lower compartment 34 which contains the drawer 15 (FIGS. 2 and 3). A back 33a is preferably fused permanently in place. The upper compartment 33 has a compartmentalized frame member 35 for positioning a source of power in the form of batteries 36. Above the batteries is a circuit board 37 carried above the partition 35a. The circuit board has connection with the power supply through a post 38, and a ribbon cable 39 is connected to a post 40 for supplying power to the emitters and detectors associated with the lock mechanism for receiving a signal therefrom which may be transmitted through the radio transmitter associated with the circuit board.

The frame member 35 is carried by a false bottom 41 which supports a lower partition 35b. The false bottom 41 has a groove 42 extending longitudinally in a central portion to facilitate bending or bowing the bottom downwardly in the middle (FIG. 4) in order to remove same from the slot 43 to permit the frame 35 and the electrical and electronic components carried thereby to be lowered into the compartment space vacated by the drawer when removed.

However, before the false bottom 41 may be removed, it is necessary to remove the drawer 15 and associated parts from the upright housing which forms the lock box A. After pulling the drawer 15 out as shown in FIG. 2 and in broken line position in FIG. 3 and with the lock in unlocked position, the lower panel 43 may be removed. After removing the security screws 44, access may be had to the elongated forks 45 which have an elongated slot 45a therein permitting the forks to be depressed so that the post 46 carried by the drawer 15 may be released from the fork thus permitting removal of the drawer through the opening 47 in the front of the lower compartment 34.

With the drawer 15 thus removed, the electrical and electronic components carried by the frame member 35 may be lowered and thereafter removed through the opening 47 to the lower compartment 34.

Referring particularly to FIGS. 2 and 3, a fastening clip is illustrated for use in attaching the key storage box A upon the window of a vehicle 11 between the glass 10 and a window frame 61 which has a sealing member including a U-shaped deformable resilient portion 60 carried within the window frame 61. The fastening clip includes a U-shaped member 62 which has inner and outer depending legs 63 and 64 respectively extending downwardly on both inner and outer sides respectively of the glass closely adjacent thereto when received in inverted position along the top of the glass. An outwardly and downwardly extending member 65 is integral with a lower portion of the outer depending leg 64 for attachment opposite an upper lip 67 of the key box device. The outer depending leg 64 is opposite an outer portion of the sealing member 60 when the top of the glass is received therein. A lower free end 66 of the inner depending leg 63 is so spaced from the glass as to facilitate reception of the fastening clip along the top of the glass. The lip 67 extends upwardly and inwardly of the storage box A integrally therewith. Thus, the fastening clip is covered for concealment thereof from the outside of the vehicle when the device is attached and the window closed with the top of the glass and the inner and outer depending legs received by the sealing member 60. The clip is preferably constructed of spring steel so that the legs resiliently, compressively grip the top of the glass by reason of being spaced closer together than the thickness of the glass.

It will be noted that the inner depending leg is shorter than the outer depending leg for avoiding pivotal movement upon the glass, and the lower free end tapers outwardly away from the inner side of the glass. The upper lip portion 67 of the key box device is opposite the free lower edge of the outer leg, and the U-shaped member is positioned along the top of the glass for reception by the sealing member without any permanent deformation thereof. The lower edge of the outer leg has a downward vertically extending leg 68 which is attached to the cabinet of the key box A adjacent the lip 67 which provides a complementary surface for engagement with the vertical leg. Thus, the rear wall 33a of the storage box A lies substantially flat up against the window glass unless the glass is curved. The clip will fit any window frame, and the storage box A is lowered with the window rather than being retained within the groove defined by the deformable portion 60. To this end the upper portion of the clip is tapered inwardly and upwardly.

The key storage box A schematically illustrated attached to a vehicle window in FIG. 1 contains a radio transmitter C which sends messages concerning the status of the vehicle to the receiver of the master transceiver E which converts it to a suitable computer communications form, and passes the message on to the central computer D. The central computer takes such action as has been defined, which may include storing the data, printing a log of the data, relaying the data to an appropriate system over telephone or other data links, and other such action as may be required. The signal transmitted by the radio transmitter C may include a signal from the decoder 27 actuated by the encoded key B or from the circuitry associated with the sensor array H.

If the box A is out of range of the master transceiver E, the message may be relayed by one or more pole units 70. A pole unit receives a message, holds it in memory until there is no communications activity, and rebroadcasts the message as described below. In addition, the pole unit may also activate a camera, voice message, siren, or flashing light. This activation may be in response to either a storage box transmission, or by direct command of the central computer D.

A vehicle identification symbol, preferably a number, may also be transmitted as from the transmitter 71 included in the system as described further below. The vehicle identification number transmitter is loaded with the vehicle identification number, or any serialized or non-serialized number. The transmitter 71 will periodically transmit this number. This transmission may be made directly to the master transceiver E or may be relayed through one or more pole units.

Alternatively, a passive transponder 72 as illustrated in FIG. 1-A may be concealed within a vehicle and, on an energizing signal from a storage box A, broadcast an identifying number. The transmitter C in the storage box A would then relay this number to the master transceiver through pole units as necessary.

COMPUTER

Figure 8A:
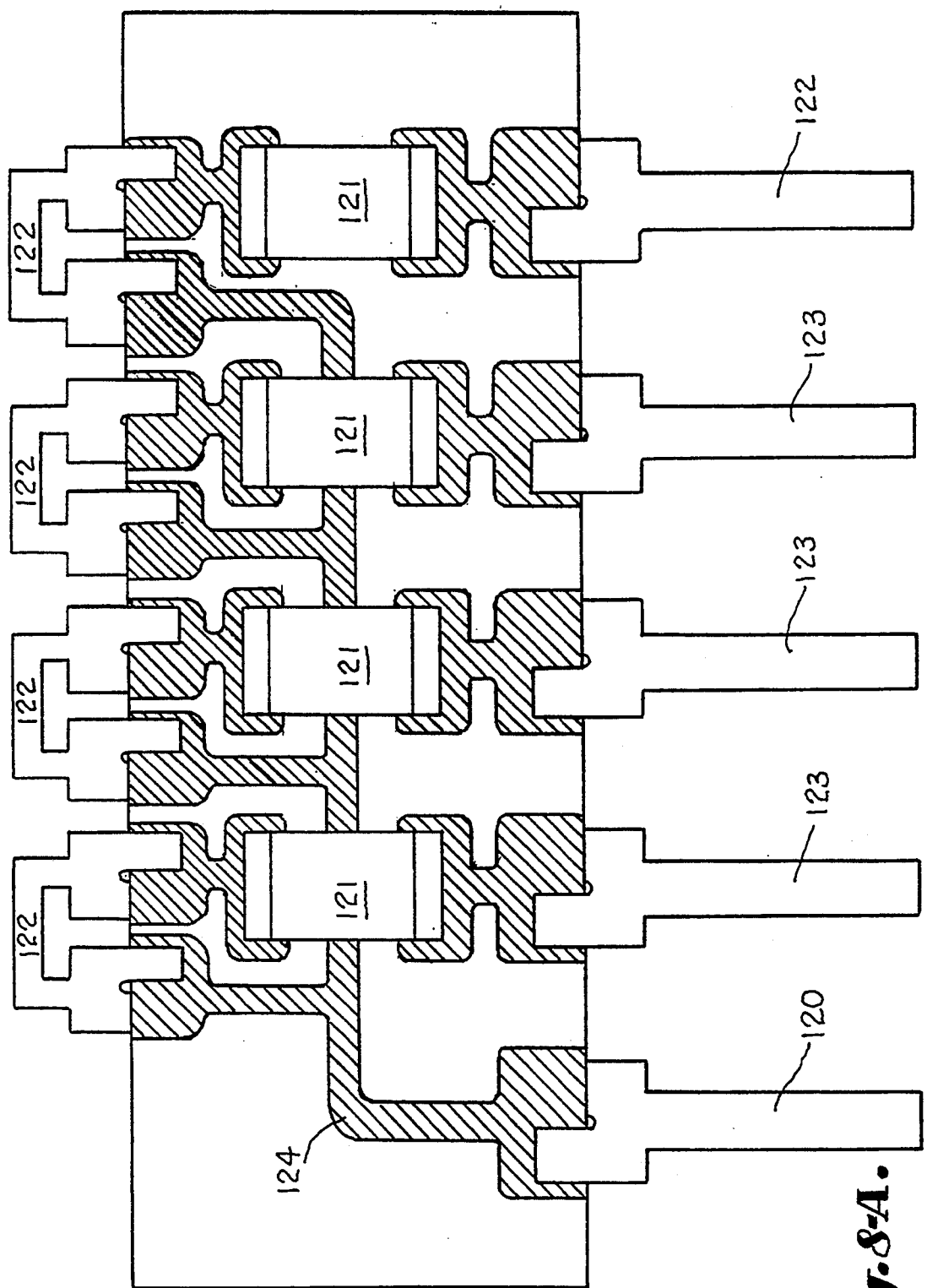
FIG. 8 is a schematic diagram illustrating electrical components, contained within the key storage box, constructed in accordance with the invention.
Figure 9:
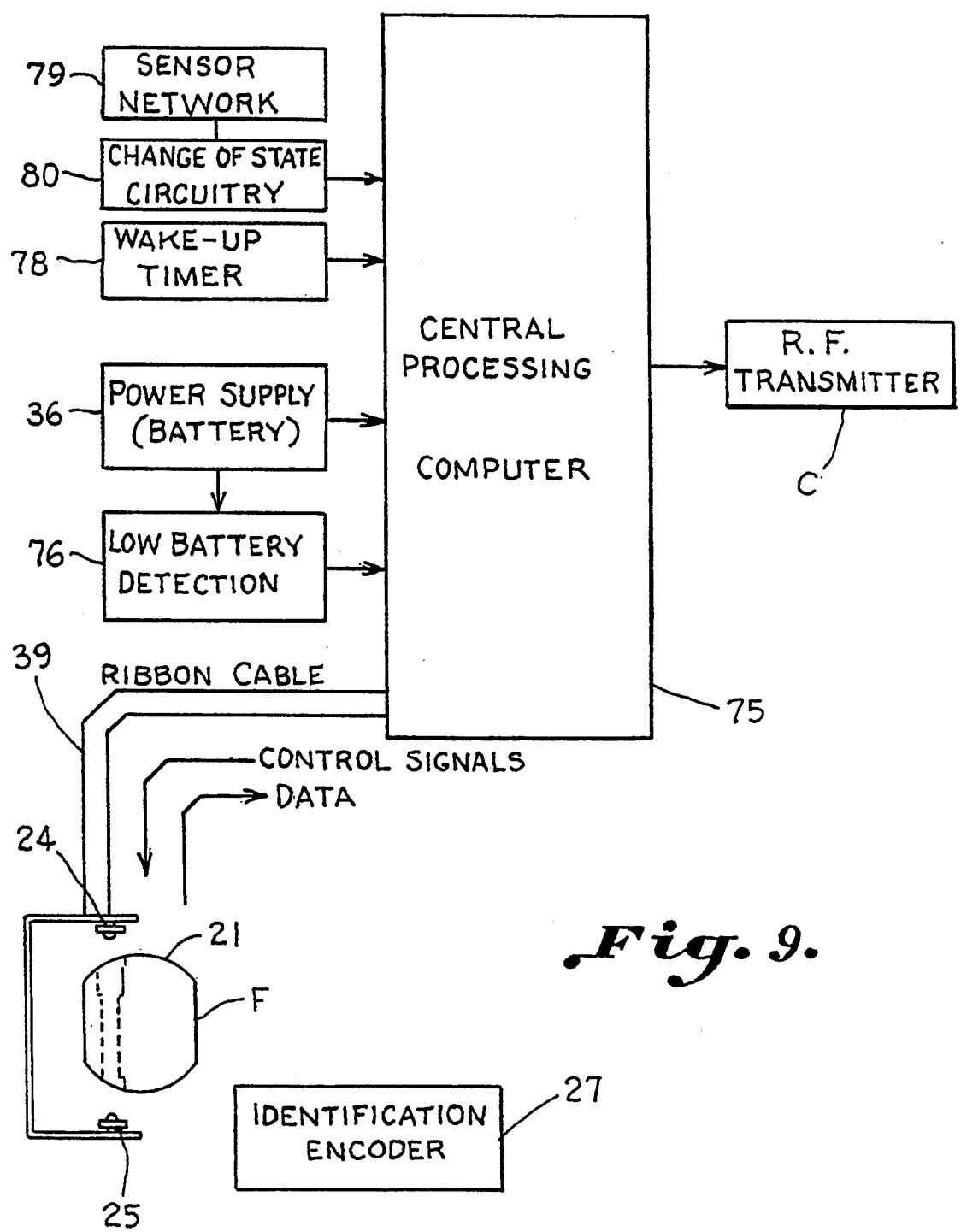
FIG. 9 is a block diagram illustrating the electrical apparatus of FIG. 8, together with related components.

FIGS. 8 and 9 illustrate the computer or central processing unit 75 contained within the storage box A powered by a battery pack 36. The computer 75 monitors a low battery detection circuit 76 and sends a low battery message when a low battery condition is detected. The computer 75 also reads an identifying symbol or number from the access key encoding matrix 27 and associated circuitry. The computer 75 monitors both a micro-power time-multiplexed regulator 78 and a sensor array 79. Change of state circuitry 80, integral with the sensor network, sends a pulse to the computer 75 on any change of state in the sensor network as may result from an external occurrence. Activity in either the sensor array or regulator cause the computer 75 to begin or continue to process signals from the sensor array and other associated circuitry. Activity in the sensor array and lock is decoded by suitable algorithms in the computer 75. As determined by these algorithms, the computer 75 may activate and modulate the radio frequency transmitter C.

POLE UNITS

Figure 10:
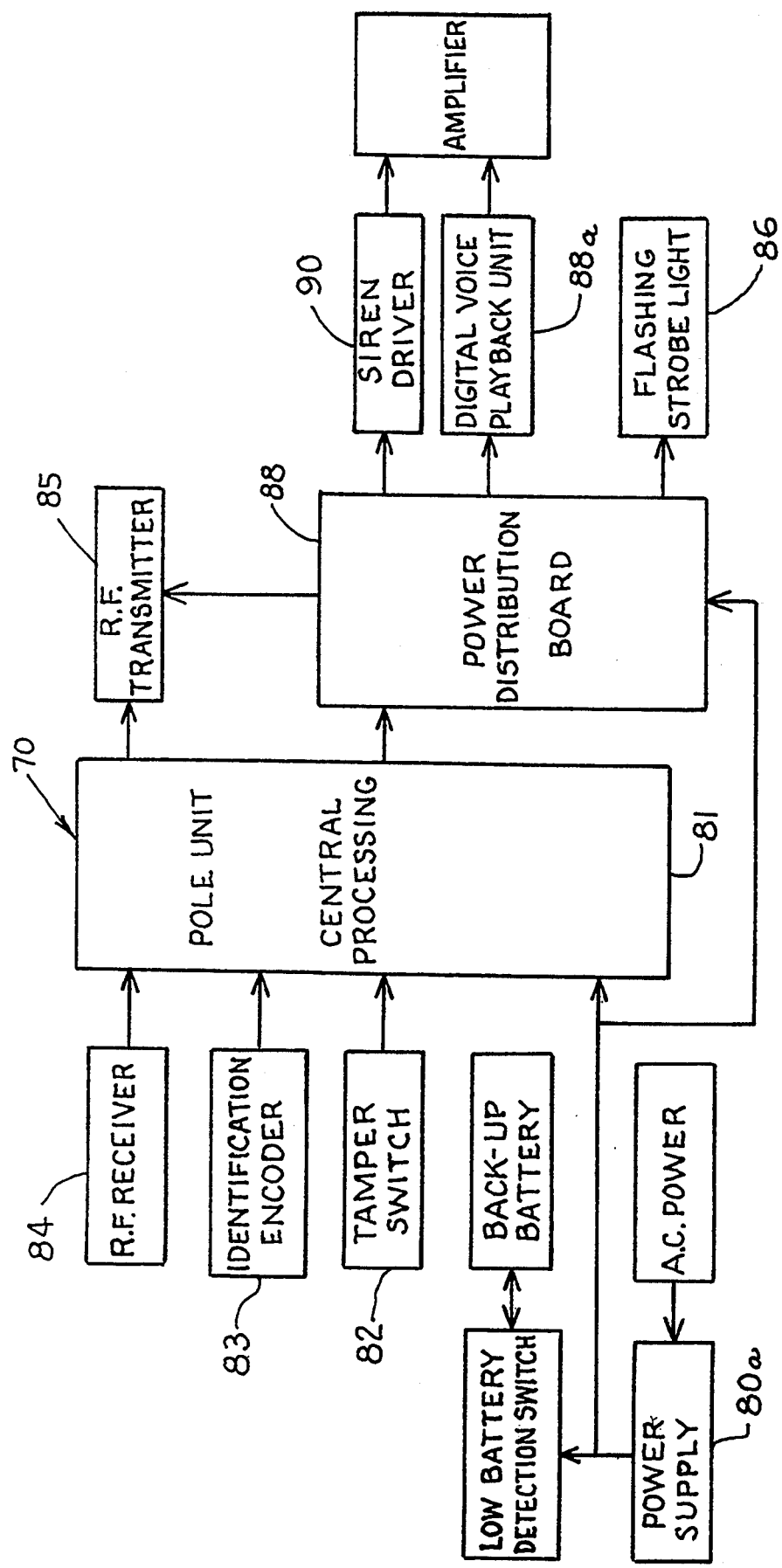
FIG. 10 is a block diagram illustrating an intermediate receiving and transmitting device utilized as a pole unit.

The pole units 70 (FIG. 10) have components schematically illustrated in FIG. 10. Alternating current power is supplied to the power supply 80a which converts and supplies required voltages. The power supply also charges a backup battery that supplies power during temporary power outages. A computer 81 monitors and controls all of the functions of the pole unit. This includes monitoring a tamper switch 82 and may send a tamper message should tampering activity be detected. The computer 81 also reads an identification symbol number from the internal identification encoder 83.

The computer 81 monitors the master transceiver E through the receiver 84 and decodes transmission from either the storage boxes A, transmitters 71 on the vehicles or the master transceiver. Such messages are stored and then retransmitted at the same frequency at which they were initially transmitted and received, and action can be initiated based on the contents of the message. The computer 81 modulates a transmitter 85 to resend any message requiring that action. The computer 81 monitors the condition of the power supply and battery and may transmit a low battery message should the condition arise. Based on the contents of a message, and stored directions from the master transceiver E, the computer 81 may activate a flashing strobe light 86, a siren driver 87 or digital voice playback unit 88a and an amplifier. Preferably, the siren driver and digital playback unit, alternate use of a speaker. A power distribution board 88 facilitates interconnection of the various devices.

MASTER TRANSCEIVER

Figure 11:
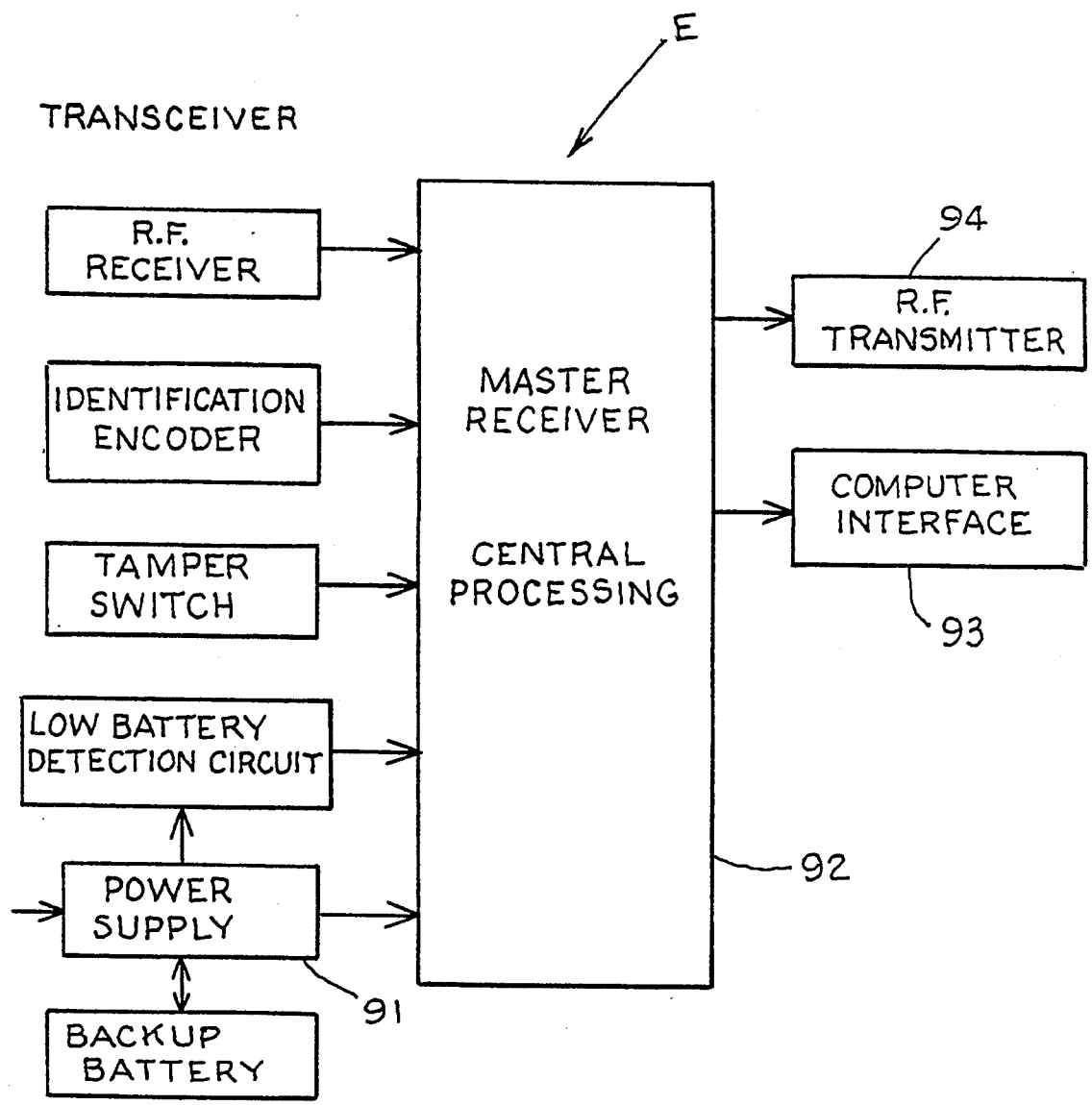
FIG. 11 further illustrates a master transceiver for use with a master computer.

The master transceiver E is illustrated in FIG. 11. The power supply 91 supplies the required regulated voltages for the master transceiver. A computer 92 monitors and controls all of the functions of the master transceiver. The power supply also provides charging power to a backup battery which provides system power during temporary power outages.

The computer 92 is connected to a computer interface 93 which converts computer signals to standard computer communications levels. The computer 92 monitors a low battery detection circuit and may pass a message to the central computer D (FIG. 1) over the computer interface if required. The computer 92 monitors radio frequency signals and records any messages received. These messages may be passed on to the central computer as required over the computer interface 93. The computer 92 also monitors the computer interface for messages from the central computer D and may transmit these messages as back to the pole units using the transmitter 94. The computer 92 also monitors the tamper circuitry of the housing and cable connected to the central computer and may send a tamper message to either the central computer over the computer interface, or the pole unit may broadcast a tamper message using the transmitter 94. The computer 92 also receives signals from the identification encoder 27 (FIGS. 6 and 9).

CENTRAL COMPUTER

Figure 12:
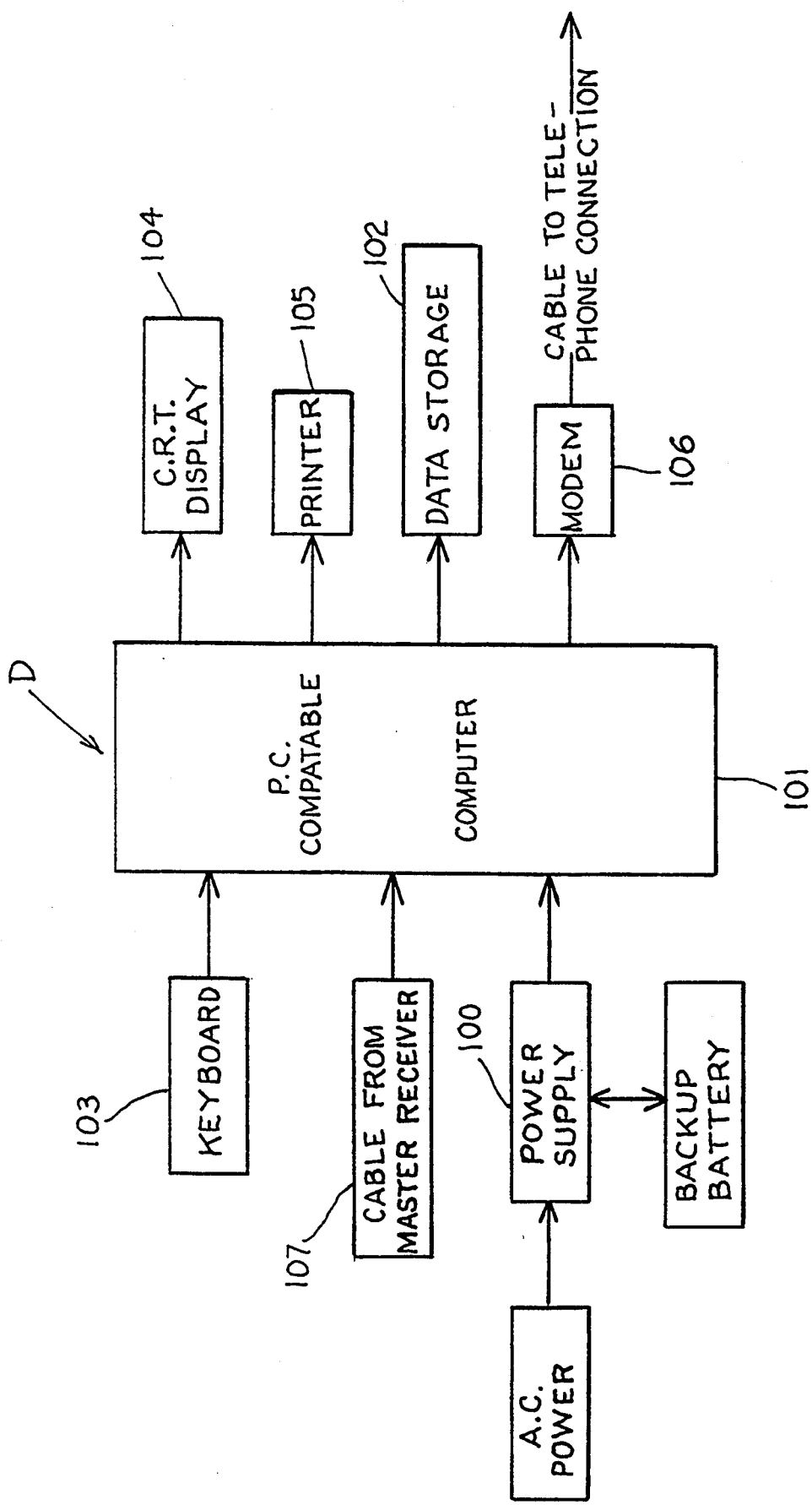
FIG. 12 is a block diagram illustrating the master computer and related components.

The central computer D is illustrated diagrammatically in FIG. 12. A power supply 100 converts and supplies regulated power to the central computer D. The power supply also provides power to a backup battery which provides system power during temporary power outages. The central computer contains a computer unit 101 that controls the actions and activities of the central computer. The computer 101 is connected to a magnetic rotating medium storage device 102 for data storage. The computer is also connected to a keyboard 103 where user commands and data may be input. A cathode ray tube display 104 where system and response data may be displayed to the user is provided. The computer 101 is also connected to a printer 105 (FIGS. 1 and 12) where data gathered by the system may be sorted and reported based upon multiple user requirements. A modem 106 is connected to the telephone network so that the computer 101 may communicate with other suitable computer systems. The computer 101 is also connected to the master transceiver as by a cable 107 (FIGS. 1 and 12). The central computer receives data messages from storage boxes A, pole units 70, modem 106, and the master transceiver E, the keyboard, and, based upon its software instructions, takes appropriate actions. The central computer may also direct actions of the pole units by sending appropriate messages to the master transceiver which then forwards the message to the pole units.

The computer D may, for example, comprise a central processing unit, memory components, storage device, expansion bus, printer port, keyboard, video display and one or more communication ports. Computer D receives and processes all of the system's information and is attached to the Master Transceiver and a telephone line. The computer D can be programmed from either the central monitoring station or the keyboard built in the cabinet. Various levels of personnel may have access ranging from unrestricted to limited access. The central computer receives and processes all information from devices 70 mounted on the dealership light poles, storage boxes A or similar mounted at various points of the facilities, devices 71 or 72 permanently mounted on the vehicles for inventory auditing, devices used to monitor and control temperatures inside the facility, and devices used to monitor for hazardous gases (not shown), devices to detect heat, rate of temperature rise, and smoke among others.

The central computer D stores this information along with the time of occurrence. The central computer contains instructions for which response, if any, is required based on received information. The central computer may signal a central monitoring station or the police or others as chosen by the dealership management.

The central computer may sort information required by the dealership management and may then display this data on the CRT display or printer. The variety of reports a central computer is capable of generating with the information it has stored is limited only by the desires of the dealership management.

In addition to producing reports, the central computer may also respond to queries as made, for example, by users.

The central computer may also monitor and effect changes in temperature through the HVAC system. Monitoring information as well as temperature adjustment instructions are received and sent from the system control center by the same radio signal means as used elsewhere in the system.

VEHICLE INVENTORY VERIFICATION

The transmitter 71 (FIG. 1) may be housed in a case also molded of polycarbonate for toughness, durability, and non-interference with radio transmissions. The device may use the same type transmitter as used in the storage box A for the same reasons of consistency and reliability of signal.

The transmitter 71 has the vehicle identification number embodied therein. A limited life, non-changeable power source provides the energy necessary to transmit the vehicle's identification number on a regular basis or whatever is specified. By utilizing transmissions from the storage box A and the transceiver, together with identification transmissions, the location of any given vehicle may be noted at anytime.

The signal may be picked up by the pole units 70. The signal is then relayed on to the central computer D which records the necessary information of vehicles checked in and when such occurred. The central computer receives such signals at a predetermined time and, as with the other devices, reports a vehicle missing after a given time as specified by the user.

The central computer stores this information in its files until such time as a report is called for either by a prearranged time or on demand by an authorized person. The authorized person may call up a report by use of a computer with a modem or by use of the computer keyboard built into the central computer D. The central computer can then print a report that includes but is not limited to vehicles financed in a floor plan that are available on the dealership premises, vehicles financed in a floor plan that are not on the dealership premises, the last time these vehicles were on the dealership premises and who was the last one to access the keys to the vehicle, as well as the activity of a vehicle or vehicles in a specified time frame.

TRAFFIC DEVICES

Devices similar to those contained in storage boxes A may be suitably secured at desired access points in and out of the dealership facilities and departments. Anytime passage is made where one of these devices is mounted, the device using an appropriate sensing method signals the central computer D of such occurrence. The central computer records the information along with the time of the event while simultaneously verifying that the dealership is either open or closed. If open, the central computer D may file the event for traffic flow reporting. If closed, the central computer may wait a predetermined time as specified by the dealership for an authorized key to validate the access, in which case, the central computer duly records who has gained access, in what department, and at what time. In the event the central computer does not receive an authorized entry signal in the predetermined allotted time, then the central computer takes appropriate action as directed by the dealership management. Such action could include, but is not limited to, sending instructions to the pole unit or other device to turn on flashing lights, sirens, voice talkers, and cameras, as well as notifying a suitable central monitoring service, the police or others as specified by the dealership management.

SENSOR NETWORK

The sensor network 79 which forms a part of sensors H carried in the storage box A includes a sensor broadly designated at 100 (FIGS. 8 and 13) which comprises a number of radially spaced electrodes 100a (FIG. 15) and a predetermined amount of mercury 100b or similar fluid conductor. The mercury is sealed in the sensor housing 101 in an inert atmosphere. The mercury quantity, volume of the container, makeup of the inert atmosphere, placement of the electrodes together with the container shape or geometry, and mechanical treatment of the electrodes are critical to correct operation of the sensor. The mercury moves about in its generally cylindrical container responsive to the occurrence of an event engaging the radially spaced electrodes (in this instance twelve), and an output signal may indicate amplitude, frequency and pattern in which the contact occurs so that the characteristics of the event may be determined or transmitted to indicate its nature.

SPACER

The sensor 100 is offset from a perpendicular to the board 37 (FIGS. 1, 3 and 4) within the storage box A at an angle of 31 degrees as illustrated in FIGS. 13–15. This is accomplished through the use of a spacer 102 which not only maintains the correct sensor angle, but also spaces the radially spaced sensor leads 100a which extend at right angles from the spacer, through the radially spaced guides 103, to correctly mate with pads on the circuit board 37.

The spacer 102 is illustrated as a truncated cylinder having an angled base 102a and a top 102b. The guides 103 terminate in radially spaced openings 103a in the angled base 102a. Suitable spaced feet 102c are provided. It will be observed (FIG. 14) that the guide openings 103a are positioned in an oval configuration about the angled base 102a so as to position the electrode pins 100a (FIG. 15) to connect with the pads arranged in circular spaced relation on the board 37. This is because of the angled relationship of the base 102a with the cylinder 102.

A first two pin sensor (FIG. 16) is constructed as a horizontal cylindrical housing 105 with an axial contact electrode 106 (FIGS. 8 and 16) running through the center of the cylinder. The ends of the housing are sealed and the housing and the electrode 106 are insulated from each other. A quantity of mercury 107 is contained inside the sensor and is so positioned to just make contact between the housing and the center electrode. The mercury quantity, volume of the container, makeup of the inert atmosphere, placement of the electrodes, container shape and mechanical treatment of the electrodes are critical to correct operation of the sensor. This sensor is mounted with its axis parallel to the surface of the circuit board with the same axis aligning with the long axis of the board. This sensor is particularly sensitive to low amplitude vibrations.

A second two pin sensor is devised as a vertical cylinder 110 (FIGS. 8 and 17) having a lower closed end. A center contact electrode 111 is inserted into the center of the cylinder from the top, but does not extend to the bottom of the cylinder. Insulating material 112 is deposited in the bottom of the cylinder and molded into a conical shape up to contact the sides of the cylinder walls. A quantity of mercury 113 is placed into the sensor. These elements combine such that, when the sensor is tilted to a predetermined angle, the mercury is displaced along the surface of the conical insulating material to make contact between the surface of the cylinder and the center electrode. The mercury quantity, volume of the container, makeup of the inert atmosphere, placement of the electrodes, and mechanical treatment of the electrodes are critical to correct operation of the sensor. This sensor is mounted with its axis perpendicular to the surface of the circuit board.

TEMPERATURE SENSOR

The additional sensor schematically included at 115 in FIG. 8 may be provided in the form of a standard, high temperature sensing device embodied as a sealed axial device having two internal contacts, one of which is a bimetallic element (not shown). At a predetermined temperature, as a function of the makeup of the bimetallic element, a set of contacts, one fixed and the other at the end of the bimetallic element, mate to indicate that the predetermined temperature has been reached. Mounting attitude of this sensor is not critical.

CHANGE OF STATE CIRCUITRY

The Sensor 100, the first of the two pin sensors broadly designated 105 having pin 106 (FIG. 8) is connected to change of state circuitry 80. This circuitry is designed to cause a pulse to be generated any time the signal levels in either of these sensors change. A single change of state sensor is devised as an exclusive-or gate 130 connected to a sensor output in the following manner. The output connection from the sensor is connected directly to one input 130c on an exclusive-or gate. The second input 130d of the exclusive-or is connected to both the first input of the exclusive-or through a resistor 130a, and to ground through a capacitor 130b.

With the sensor output low in steady state, a pulse is generated as follows. The sensor output goes high causing the direct connected input of the exclusive-or to go high. The second input of the exclusive-or is also driven high, but, since the input pin must overcome the charging time of the capacitor through the resistor, a small amount of time passes before this pin also reaches a high condition. During this time period, the exclusive-or condition of the gate is satisfied causing a transition in the exclusive-or output pin 130e. As the second input pin reaches a high condition, the exclusive-or condition is rendered false, causing the output to return to the unsatisfied state.

During a high to low transition, the first input pin is pulled low immediately, while the second input pin remains high while the capacitor bleeds its charge through the resistor. Again, for a short period of time, the exclusive-or condition of the gate is satisfied.

The circuit is embodied in the storage box A by using multiple not-exclusive-or open collector output chips. Each chip contains multiple gates. The outputs of the gates are connected in a wired or configuration with a single pullup resistor. Thus, a change of state in the monitored sensor network causes a low going pulse in the circuit output. The values of the resistors and capacitors are selected to best compliment the sensor response times and processor input specifications.

TWO PIN TEST JUMPER

Two adjacent pins 130a and 130b (FIG. 8) are provided that, when shorted, cause the storage box A to enter a diagnostic test and transmit routine. This test is used to confirm operation of all of the storage box circuitry and test and tune the transmitter.

IDENTIFICATION DECODER

The storage box A contains an identification decoder 27 (FIG. 8) capable of decoding sixteen bits of user determined data. This data is used to identify both the storage box identification number, and the system number. This decoder is embodied as a four by four resistor matrix providing sixteen programmable positions. The decoder is driven by four computer outputs and uses four inputs. A single output feeds a common buss 124 to four of the encoding resistor elements 121 (FIG. 8-A) contained in custom programmable single inline package (SIP) package illustrated in FIG. 8-A and schematically in FIG. 8. A suitable chip or other component may be used in lieu of the SIP. If a resistor is enabled, current is conducted throughout 123 to the base of one of four transistors 125, causing it to switch. This switching is routed to the input pins 126. If the resistor element has been manually disabled by cutting loop 122, the transistor does not switch. The transistors are connected in a one to one relationship with the four computer input pins. The computer reading of these inputs determines the first four identification bits. This process is repeated for three more banks of SIP resistor packs. Software in the computer drives the outputs, reads the inputs, concatenates the recovered data, and parses both the box identification and system identification from the recovered data.

MICRO-POWER TIME-MULTIPLEXED REGULATOR

A Micro-Power Time-Multiplexed Regulator 78 (FIG. 8) is embodied in the storage box A. This power regulator operates with extremely small current consumption. It periodically wakes up the computer. The circuit works as follows. The circuitry in the storage box A is placed in a minimum power consumption mode. A resistor 140 capacitor 141 network is devised so that the capacitor is charged through this resistor. The level of this charge is monitored by the gate of a Programmable Unijunction Transistor 142 PUT. When the programmed voltage of the PUT is reached, the PUT conducts. The PUT is connected to such circuitry as required to create a pulse that reactivates the computer 75. The computer performs such tasks as directed by its software, discharges the capacitor, places itself in low power mode, returning control to the micro-power time-multiplex regulator control circuit. The capacitor is recharged through the resistor, repeating the cycle.

TRANSMITTER

A radio frequency transmitter C (FIG. 8) is incorporated in each storage box A. The storage box uses this link to transmit and receive such data as may be determined by software running in the computer. The format of the message, and modulation of the radio frequency carrier is under the control of software in the computer 75. Data is transmitted using dual tone down modulation techniques. The frequency, performance, and control of the transmitter are designed to enable operation of the device under FCC rules such that storage box A sites do not require individual licensing.

A low battery detection circuit 76 is included in each storage box A. This circuit uses Zenner diodes 142 with predetermined breakdown voltages, and resistor voltage divider to feed the base of switching transistors 143. The circuit is so designed that a low battery condition may be read by software in the computer 75.

An extreme low power detect circuit 144 halts the computer in an extreme low power condition. When power levels return to operable levels, this circuitry automatically restarts the computer. This condition might arise from an out of parameter temperature excursion affecting battery voltage.

Since the storage box A has a lock assembly capable of discerning 256 different keyed alike keys, use of one bit as for parity error checking reduces the number of discernable keys to 128. Software in the computer 75 directs the hardware to turn on the lock F electronics as well as retrieve data in the following manner.

The lock circuitry is actuated through the lock interface plug 40 (FIGS. 4 and 8), and a return signal from the cam proximity circuit (FIG. 6-A) is read. If the lock is being opened, the cam proximity sensors 28 and 29 (FIG. 6-A) will send back a high signal, a low signal is returned if the lock is not being opened. If the cam proximity signal is high, the first four of the eight infrared led's 24 are turned on with a select signal. Four data lines from four of the eight phototransistors 25 are read and the data stored pending lock read completion. The other bank of four led's are turned on and the four data lines present data from the other four phototransistors. The lock is turned off. The two four bit nibbles are combined to form an eight bit data word. This data word is stored. After a short predetermined time, the lock read cycle is repeated. The data is combined and compared to the stored eight bit data word. After a predetermined number of identical reads, the data is considered valid and stored for future use. The lock board is turned off and then only periodically interrogated to determine if it is being returned to the locked position. When the lock is re-locked, data reflecting this action is stored.

Each storage box A may use a suitable computer 75 such as a Motorolla MC68HC05 Micro-Processor. This processor includes oscillator drive circuitry, thirty-one input/output pins, timer, reset circuitry, interrupt circuitry, computer operating properly circuitry, watch dog timer, random access memory, program memory, and other control and protection circuits. The computer, under software control, controls all of the functions of the storage box A.

The system software is started automatically by the computer as it comes out of power on reset. The software first initializes all of the processor data ports and memory locations, sets up initial operating conditions, discharges the capacitor 141 and places the processor in a low power consumption sleep mode. The processor is then awakened by either an interrupt from the regulator 78, or an interrupt from the change of state circuitry 80 or key reading circuitry.

On wakeup, the processor first determines whether the interrupt was caused by the regulator 78 or change of state circuitry 80. The result of this test helps define additional processing to be done.

On a regulator 78 interrupt, the processor checks the state of the sensors, updates internal clocks, and, if necessary, sends low battery, lock, over-temperature, status, and/or diagnostic messages, among others.

On wakeup caused by the change of state circuitry 80, in addition to the above checks, a more intensive examination is made of the sensor and state change circuitry. This same intensive examination can also be triggered by activity in the sensors during the less intensive examination made during the regulator checks.

Data from the sensors is processed in both time and frequency domains in a dynamic time window that varies with sensor activity. Amplitude of signal may be utilized as well as pattern recognition capability based on patterns resulting from known activity.

The sensors 100 and 105 operate responsive to movement causing mercury make or break contact reflecting activity adjacent a vehicle. Observation of such activity on a continuous basis would result in excessive power consumption. Therefore, the change of state circuit 80 is provided, operating at very low power, to supply a signal upon the commencement of activity of a character that might deserve further scrutiny.

This is accomplished by actuation of the computer containing a sampling and decision making algorithm. Once activated by the change of state circuitry, the algorithm periodically checks the sensor outputs recording the frequency and magnitude of changes over a predetermined interval. That magnitude is compared to a predetermined table to determine what action if any is required.

Over a predetermined period of time a number of samples are taken at a predetermined rate. This number of changes of state is compared to a table to determine what message, if any, needs to be transmitted by the computer. The table is derived especially by sampling known events. Such a table, for example, is set forth below although such may be as comprehensive as desired and, therefore, more detailed.

A table is as follows:

|  |  | Comparison Value (Changes of State) | Result (Value Transmitted) |
|---|---|---|---|
| Trigger | Equ | 2 | 0 |
| Trigger1 | Equ | 15 | 1 |
| Trigger2 | Equ | 50 | 2 |
| Trigger3 | Equ | 90 | 3 |
| Trigger4 | Equ | 125 | 4 |
| Trigger5 | Equ | 175 | 5 |
| Trigger6 | Equ | 200 | 6 |
| Trigger7 | Equ | 230 | 7 |

For 500 Samples in One Second

The above table is entered with the number of changes of state generated in one second. This entry is used to determine the maximum result value which may be used to determine whether further processing or notification need be made. This table may be of any size and/or detail.

If a determination is made that further action is required, the computer composes a message and modulates the transmitter (C) initiating a transmission to the master computer (D). Recorded samples are discarded periodically generally commensurate with the rates at which they were gathered.

When the software concludes that a message needs to be sent, data is buffered and control passed to a transmit subroutine.

Several conventional internal timeout and parameter control factors (not shown) may be provided to prevent and control retransmissions of like messages, customer inspection time windows, presentation time windows, test drive time windows, test drives and test drive returns, post test drive inspections, periodic internal timers, sensitivity levels, and other defined constants.

Computer Operating Properly circuitry on the processor is utilized to insure that the program software is operating correctly. A fail condition causes a system reset and controlled restart of the system and software.

While a preferred embodiment of the invention has been described using specific terms, such description is for illustrative purposes only, and it is to be understood that changes and variations may be made without departing from the spirit or scope of the following claims.

What is claimed is:

1. A key operated control system for vehicles comprising:
   a central computer for monitoring a group of vehicles;
   a plurality of storage devices each storing an operating key carried by respective vehicles;
   an access key for gaining access to said storage devices and said operating keys stored therein;
   a radio frequency transmitter carried by said storage devices actuated responsive to said access key transmitting a signal that a respective vehicle storage device has been accessed; and
   a transceiver inputting said signal into said central computer.

2. The structure set forth in claim 1 including a plurality of encoded access keys, said storage devices including sensing means indicating changes of state responsive to the occurrence of an event adjacent the sensing means actuating said radio frequency transmitter.

3. The structure set forth in claim 1 including a signal generator, and a transmitter carried by said vehicles transmitting a signal identifying said vehicles to said central computer.

4. A key operated control system for vehicles comprising:
   a plurality of storage devices each storing a vehicle operating key of a respective vehicle on said vehicle;
   a plurality of encoded access keys for limiting and gaining access to said storage devices and said vehicle keys stored therein;
   a radio frequency transmitter carried by said vehicles actuated responsive to said access key transmitting a signal that a respective vehicle has been accessed by a particular coded key;
   a central computer for monitoring vehicles on a premises of said vehicle dealership; and
   a transceiver inputting said signal into said central computer.

5. The method of operating a key control system for vehicles comprising the steps of:
   providing a central computer for monitoring a group of vehicles;
   positioning a plurality of storage devices each storing an operating key upon respective vehicles;
   providing an access key each capable of gaining access to said storage devices and said operating keys stored therein to a number of persons;
   providing a transmitter carried by said storage devices actuated responsive to said access key transmitting a signal that a respective vehicle storage device has been accessed; and
   providing a transceiver for receiving said signal and inputting said signal into said central computer.

6. The method set forth in claim 5 including encoding said access keys and decoding said access key.

7. The method set forth in claim 5 including the step of providing sensing means indicating changes of state responsive to the occurrence of an event adjacent the sensing means actuating said radio frequency transmitter.

8. The method set forth in claim 5 including receiving, storing and retransmitting said signal at a later time and at the same frequency at which it was received.

9. The method set forth in claim 7 including providing remote means receiving signals indicating changes of state, storing and retransmitting to said transceiver said signals at the same frequency at which they were received and receiving a responsive signal from said transceiver at said remote means.

10. A sensor operated control system for a group of vehicles comprising:

a sensor array carried at each respective vehicle of said group of vehicles for periodically sampling conditions adjacent said vehicle;

a first computer;

a change of state pulse generator actuating said first computer on any change of state in the sensor array responsive to conditions adjacent a vehicle;

a radio transmitter;

said first computer having means for providing an output responsive to a predetermined change of state of said sensor array energizing said radio transmitter;

a central computer receiving an output from said radio transmitter;

storage boxes positionable upon said vehicles containing said sensor array, said pulse generator, said radio transmitter and said first computer; and a lock limiting access to said storage box responsive to any of a plurality of encoded access keys;

whereby conditions adjacent a vehicle may be signaled to operators of the group of vehicles.

* * * * *